United States Patent
Mita

(10) Patent No.: US 9,537,170 B2
(45) Date of Patent: Jan. 3, 2017

(54) BIOFUEL CELL AND ELECTRONIC DEVICE

(71) Applicant: Sony Corporation, Tokyo (JP)

(72) Inventor: Hiroki Mita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 113 days.

(21) Appl. No.: 14/380,021

(22) PCT Filed: Nov. 27, 2012

(86) PCT No.: PCT/JP2012/080556
§ 371 (c)(1),
(2) Date: Aug. 20, 2014

(87) PCT Pub. No.: WO2013/132707
PCT Pub. Date: Sep. 12, 2013

(65) Prior Publication Data
US 2015/0017553 A1 Jan. 15, 2015

(30) Foreign Application Priority Data
Mar. 9, 2012 (JP) ................................ 2012-053641

(51) Int. Cl.
*H01M 8/16* (2006.01)
*H01M 8/00* (2016.01)
(Continued)

(52) U.S. Cl.
CPC ............... *H01M 8/16* (2013.01); *H01M 8/004* (2013.01); *H01M 8/0252* (2013.01); *H01M 8/243* (2013.01);
(Continued)

(58) Field of Classification Search
None
See application file for complete search history.

(56) References Cited

U.S. PATENT DOCUMENTS

2007/0196722 A1\* 8/2007 Tomita .............. H01M 8/04201
429/401
2010/0248042 A1 9/2010 Nakagawa et al.
(Continued)

FOREIGN PATENT DOCUMENTS

JP 2009-158466 7/2009
JP 2010-033824 2/2010
(Continued)

OTHER PUBLICATIONS

Takefumi Shimoyama et al., Electricity generation from model organic wastewater in a cassette-electrode microbial fuel cell, Appl Microbial Biotechnol, vol. 80, Jun. 26, 2008, p. 325-330. (6 pages).

*Primary Examiner* — Miriam Stagg
*Assistant Examiner* — Carmen Lyles-Irving
(74) *Attorney, Agent, or Firm* — Chip Law Group

(57) ABSTRACT

A small and high-density biofuel cell capable of easily supplying fuel; and an electronic apparatus are provided. The biofuel cell is formed using a stack in which two power generating bodies that include at least a pair of electrodes and a separator are stacked through a gas diffusion layer through which only gas is permeable, the electrodes forming an anode and a cathode and having at least one surface on which an oxidoreductase is present, the separator being arranged between the electrodes and including a proton permeable membrane. In addition, cathode-side surfaces of the respective power generating bodies of the stack are arranged in contact with the gas diffusion layer. This biofuel cell is mounted on the electronic apparatus.

6 Claims, 10 Drawing Sheets

5: FUEL SOLUTION
24: FUEL TANK
23a TO 23e: STACKS

(51) Int. Cl.
   *H01M 8/24*    (2016.01)
   *H01M 8/02*    (2016.01)
   *H01M 8/10*    (2016.01)

(52) U.S. Cl.
   CPC ..... *H01M 2008/1095* (2013.01); *Y02E 60/527* (2013.01)

(56) References Cited

U.S. PATENT DOCUMENTS

2011/0039164 A1* 2/2011 Akers ................ H01M 4/86
                                                    429/401
2012/0003504 A1   1/2012 Yamazawa et al.

FOREIGN PATENT DOCUMENTS

| JP | 2010-516017 | 5/2010 |
| JP | 2010-219021 | 9/2010 |
| JP | 2011-258393 | 12/2011 |
| WO | 2010/044145 | 4/2010 |

\* cited by examiner 1a, 1b: POWER GENERATING BODY
2: GAS DIFFUSION LAYER
3: LAMINATE
4: FUEL TANK
5: FUEL SOLUTION 1a, 1b: POWER GENERATING BODY
2: GAS DIFFUSION LAYER
3: LAMINATE
11a, 11b: ANODE
12a, 12b: CATHODE
13a, 13b: SEPARATOR
14a, 14b, 15a, 15b: CURRENT COLLECTOR
16a, 16b: PROTECTIVE SHEET

A

B

5: FUEL SOLUTION
24: FUEL TANK
23a TO 23e: STACKS 1a, 1b: POWER GENERATING BODY
2: GAS DIFFUSION LAYER
3: LAMINATE
4: FUEL TANK
5: FUEL SOLUTION

A

B 1a, 1b: POWER GENERATING BODY
2: GAS DIFFUSION LAYER
3: LAMINATE
4: FUEL TANK
5: FUEL SOLUTION
6: COVER

A    B

2: GAS DIFFUSION LAYER
4: FUEL TANK
5: FUEL SOLUTION
11: ANODE
12: CATHODE
13: SEPARATOR

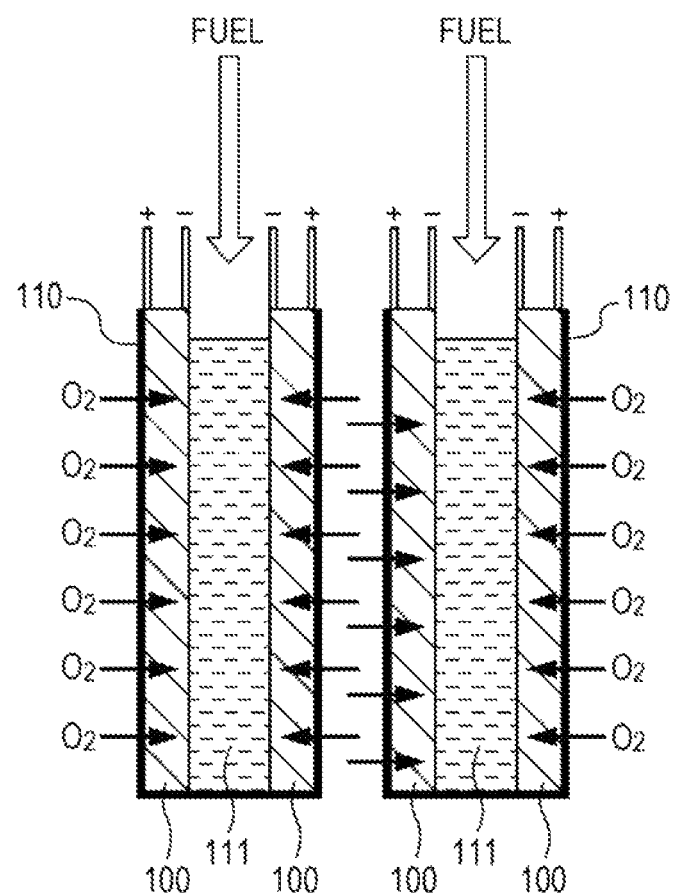

BIOFUEL CELL AND ELECTRONIC DEVICE

CROSS REFERENCES TO RELATED APPLICATIONS

The present application is a national stage of International Application No. PCT/JP2012/080556 filed on Nov. 27, 2012 and claims priority to Japanese Patent Application No. 2012-053641 filed on Mar. 9, 2012, the disclosure of which is incorporated herein by reference.

BACKGROUND

The present technique relates to a biofuel cell using an oxidoreductase and an electronic apparatus. More specifically, the present technique relates to a biofuel cell having a configuration in which two or more power generating portions are connected in series or in parallel and an electronic apparatus including this cell.

Recently, a fuel cell (hereinafter, referred to as "biofuel cell") in which an oxidoreductase is immobilized on at least one electrode of an anode or a cathode as a reaction catalyst has attracted attention. This biofuel cell can efficiently extract electrons from fuel such as glucose or ethanol which is hardly reactive with an ordinary industrial catalyst and thus has been expected as the next-generation fuel cell having high capacity and high safety.

FIG. 11 is a diagram schematically illustrating the power generation principle of a biofuel cell using an enzyme. For example, in the case of a biofuel cell illustrated in FIG. 11 in which glucose is used as fuel, the glucose is degraded by an enzyme immobilized on a surface of an anode 101 to extract electrons ($e^-$) and generate protons ($H^+$). In addition, in a cathode 102, water ($H_2O$) is produced from protons ($H^+$) transported from the anode 101 through a proton conductor 103, electrons ($e^-$) transported through an external circuit, and oxygen ($O_2$), for example, in the air. By allowing these reactions to simultaneously occur, electric energy is generated between the electrodes.

On the other hand, the fuel cell has a problem that the voltage of a single cell is low. In the biofuel cell, a structure in which plural cells are connected in series and/or in parallel to improve output is disclosed (for example, refer to PTLs 1 and 2). In addition, in the related art, an immersion-type biofuel cell is also disclosed in which the volume of a single cell is reduced by bringing a fuel solution into contact with an air electrode (cathode) and stacking an anode and a cathode through a separator to increase electric capacitance (refer to PTL 3).

CITATION LIST

Patent Literature

PTL 1: Japanese Unexamined Patent Application Publication No. 2009-158466
PTL 2: Japanese Unexamined Patent Application Publication No. 2010-219021
PTL 3: Japanese Unexamined Patent Application Publication No. 2011-258393

SUMMARY

Technical Problem

However, the above-described fuel cells of the related art have the following problems. FIG. 12 is a diagram schematically illustrating a configuration of a biofuel cell of the related art. The fuel cell can continuously generate power for a long period of time by additionally supplying fuel. However, for example, in the case of a module-type fuel cell illustrated in FIG. 12 in which plural cells are connected, it is necessary that fuel be individually supplied to each cell or each fuel tank 110. In addition, one cover is necessary for each fuel tank 110. Therefore, the fuel cell of the related art has a problem that a fuel supply operation is complicated.

In addition, even when one fuel injection port is provided, it is necessary that a fuel distribution mechanism such as a flow channel be provided inside the cell, which causes complication of the device and a decrease in output per unit volume. Further, in the biofuel cell, it is necessary that the cathode 102 which is the air electrode be brought into contact with the outside air. Therefore, even when power generating bodies 100 which include the anode 101 and the cathode 102 are adhered to the fuel tank 110 to be integrated, it is necessary that an air layer be provided irrespective of the fuel tank 110. Therefore, the biofuel cell of the related art has a problem that the cell volume increases.

Accordingly, a main object of the present disclosure is to provide a small and high-density biofuel cell capable of easily supplying fuel; and an electronic apparatus.

Solution to Problem

According to the present disclosure, there is provided a biofuel cell including: plural power generating bodies that include at least a pair of electrodes and a separator, the electrodes forming an anode and a cathode and having at least one surface on which an oxidoreductase is present, the separator being arranged between the electrodes and including a proton permeable membrane; and a gas diffusion layer that is arranged in contact with cathode-side surfaces of the power generating bodies and through which only gas is permeable, in which one power generating body and another power generating body are stacked through the gas diffusion layer.

In the biofuel cell according to the present disclosure, since oxygen is supplied through the gas diffusion layer, it is not necessary that the cathode of the power generating body be brought into contact with the outside air. As a result, the cell volume can be reduced.

In this biofuel cell, the respective power generating bodies may be connected in series. In this case, a fuel solution in a fuel tank can be mutually separated by a stack of the power generating bodies and the gas diffusion layer.

In addition, a stack of the power generating bodies and the gas diffusion layer may be detachable from the fuel tank.

Further, plural stacks of the power generating bodies and the gas diffusion layer can be connected through a cover of a fuel tank.

Furthermore, the gas diffusion layer can be formed of, for example, carbon paper, carbon cloth, or a non-woven or porous metal material.

According to the present disclosure, there is provided an electronic apparatus including a biofuel cell, in which the biofuel cell includes plural power generating bodies that include at least a pair of electrodes and a separator, the electrodes forming an anode and a cathode and having at least one surface on which an oxidoreductase is present, the separator being arranged between the electrodes and including a proton permeable membrane; and a gas diffusion layer that is arranged in contact with cathode-side surfaces of the power generating bodies and through which only gas is permeable, in which one power generating body and another power generating body are stacked through the gas diffusion layer.

Advantageous Effects of Invention

According to the present disclosure, since two power generating bodies are stacked through the gas diffusion layer, the cell volume can be reduced without output being decreased. Further, fuel supply can be simplified.

Additional features and advantages are described herein, and will be apparent from the following Detailed Description and the figures.

BRIEF DESCRIPTION OF THE FIGURES

FIG. 12 is a diagram schematically illustrating a configuration of a biofuel cell of the related art.

DETAILED DESCRIPTION

Hereinafter, embodiments of the present disclosure will be described in detail with reference to the accompanying drawings. In addition, the present disclosure is not limited to respective embodiments described below. In addition, the description will be made in the following order.

1. First Embodiment
(an example of a biofuel cell in which two power generating bodies are stacked through a gas diffusion layer)
2. First Modification Example of First Embodiment
(an example of a biofuel cell in which a stack is detachable from a fuel tank)
3. Second Modification Example of First Embodiment
(an example of a biofuel cell in which a cell is circular)
4. Second Embodiment
(an example of a biofuel cell in which plural stacks are provided)
5. Modification Example of Second Embodiment
(an example of a biofuel cell in which plural stacks are connected)

1. First Embodiment

Overall Configuration

Figure 1:
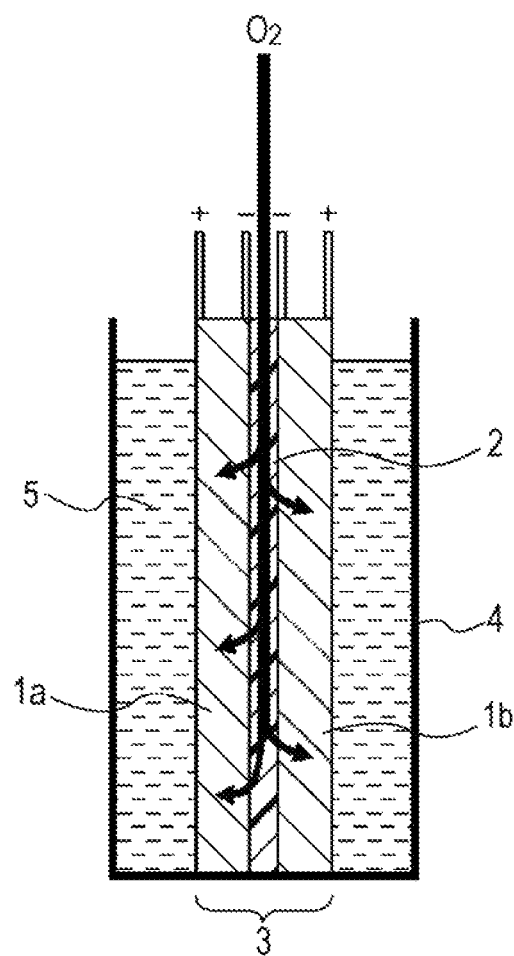
FIG. 1 is a cross-sectional view schematically illustrating a cell configuration of a biofuel cell according to a first embodiment of the present disclosure.
Figure 2:
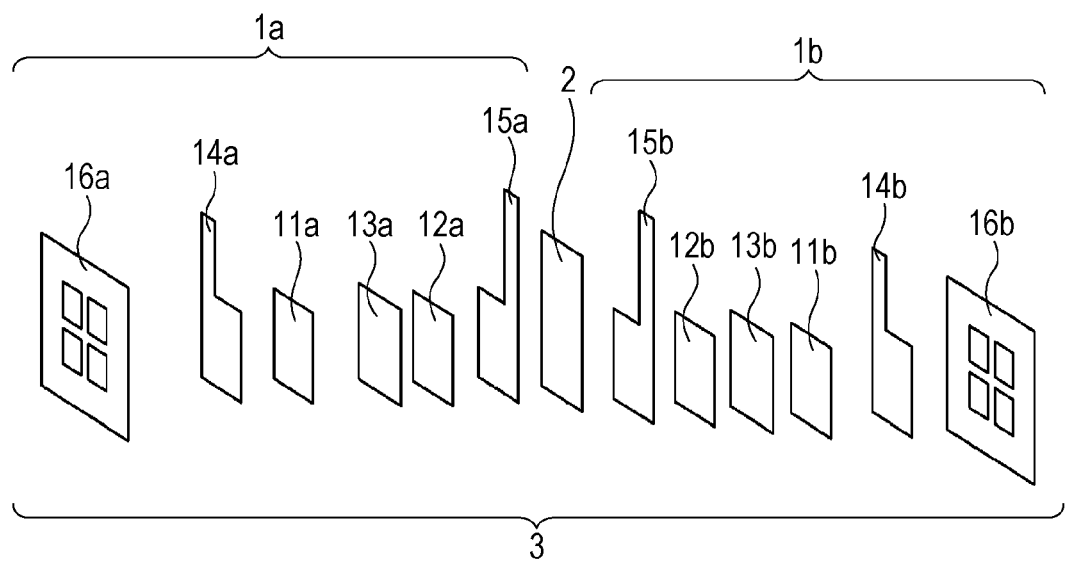
FIG. 2 is an exploded perspective view illustrating a structure example of a stack 3 illustrated in FIG. 1.

First, a biofuel cell according to a first embodiment of the present disclosure will be described. FIG. 1 is a cross-sectional view schematically illustrating a cell configuration of a biofuel cell according to this embodiment. FIG. 2 is an exploded perspective view illustrating a structure example of a stack 3. As illustrated in FIG. 1, the biofuel cell according to the embodiment has a structure in which two power generating bodies 1a and 1b are stacked through a gas diffusion layer 2.

[Power Generating Bodies 1a and 1b]

As illustrated in FIG. 2, the power generating bodies 1a and 1b are provided with anodes 11a and 11b and cathodes 12a and 12b, and separators 13a and 13b are arranged between the anodes and the cathodes. In addition, an oxidoreductase is present on electrode surfaces of either or both of the anodes 11a and 11b and the cathodes 12a and 12b. The electrode surfaces described herein include all of outside surfaces of the electrodes and inside surfaces of spaces inside the electrodes. The same shall be applied to the following description.

In addition, current collectors 14a, 14b, 15a, and 15b are arranged in contact with the anodes 11a and 11b and the cathodes 12a and 12b. These power generating bodies 1a and 1b are integrated by, for example, two protective sheets 16a and 16b. In addition, in FIG. 2, the separators 13a and 13b are arranged in contact with the respective electrodes. However, positions of the anodes 11a and 11b and positions of the anode current collectors 14a and 14b may be switched. Likewise, positions of the cathodes 12a and 12b and positions of the cathode current collectors 15a and 15b may be switched.

(Anodes 11a and 11b)

The anodes 11a and 11b are fuel electrodes, and for example, electrodes in which an oxidoreductase is immobilized on an electrode surface formed of a conductive porous material can be used. As the conductive porous material used at this time, a well-known material can be used, and a carbon-based material such as porous carbon, carbon pellet, carbon felt, carbon paper, carbon fiber, or a stack of carbon fine particles is particularly preferable.

In addition, for example, when a fuel component is glucose, glucose dehydrogenase (GDH) for degrading glucose can be used as an enzyme immobilized on surfaces of the anodes 11a and 11b. Further, when monosaccharide such as glucose is used as a fuel component, it is preferable that a coenzyme oxidase or an electron transfer mediator be immobilized on the anode surface together with an oxidase which promotes monosaccharide such as GDH to be oxidized and degraded.

The coenzyme oxidase oxidizes a coenzyme (for example, $NAD^+$ or $NADP^+$) reduced by an oxidase and a reductant of a coenzyme (for example, NADH or NADPH), and examples thereof include diaphorase. When the coenzyme is returned to an oxidant due to the action of the coenzyme oxidase, electrons are generated, and the electrons are transported from the coenzyme oxidase to the electrodes through the electron transfer mediator.

In addition, as the electron transfer mediator, a compound having a quinone skeleton is preferable, and a compound having a naphthoquinone skeleton is particularly preferable. Specifically, 2-amino-1,4-naphthoquinone (ANQ), 2-amino-3-methyl-1,4-naphthoquinone (AMNQ), 2-methyl-1,4-naphthoquinone (VK3), 2-amino-3-carboxy-1,4-naphthoquinone (ACNQ), and the like can be used.

In addition, as the compound having a quinone skeleton, for example, a compound having an anthraquinone skeleton such as anthraquinone-1-sulfonic acid, anthraquinone-2-sulfonic acid, or anthraquinone-2-carboxylic acid and a derivative thereof can also be used in addition to the compound having an naphthoquinone skeleton. Further, as necessary, one or two or more other compounds which function as the electron transfer mediator may be immobilized together with the compound having a quinone skeleton.

On the other hand, when polysaccharide is used as a fuel component, it is preferable that a degrading enzyme which promotes degradation such as hydrolysis of the polysaccharide to produce monosaccharide such as glucose be immobilized in addition to the oxidase, the coenzyme oxidase, the coenzyme, and the electron transfer mediator described above. In addition, "polysaccharide" described herein is polysaccharide in a broad sense, refers to all the carbohydrates which produce two or more monosaccharide molecules by the hydrolysis, and includes oligosaccharide such as disaccharide, trisaccharide, or tetrasaccharide. Specifically, examples of the polysaccharide include starch, amylose, amylopectin, glycogen, cellulose, maltose, sucrose, and lactose. These examples are obtained by binding two or more monosaccharides, and all the polysaccharides contain glucose as monosaccharide which is a binding unit.

In addition, amylose and amylopectin are components contained in starch, and starch is a mixture of amylose and amylopectin. For example, when glucoamylase is used as a degrading enzyme of polysaccharide, and when glucose dehydrogenase is used as an Oxidase for degrading monosaccharide, polysaccharide which can be degraded into glucose by glucoamylase can be used as a fuel component.

Examples of such polysaccharide include starch, amylose, amylopectin, glycogen, and maltose. Glucoamylase described herein refers to a degrading enzyme which hydrolyzes α-glucan such as starch to produce glucose, and glucose dehydrogenase described herein refers to an oxidase which oxidizes β-D-glucose into D-glucono-δ-lactone.

In addition, the anodes 11a and 11b are not limited to an electrode in which an oxidoreductase is immobilized on a surface thereof. As long as an oxidoreductase is present on an electrode surface, for example, an electrode to which a microorganism having an oxidoreductase and functioning as a reaction catalyst is adhered can be used.

(Cathodes 12a and 12b)

The cathodes 12a and 12b are air electrodes, and air is introduced from the gas diffusion layer 2 thereinto in the biofuel cell according to the embodiment. The electrodes forming the cathodes 12a and 12b are not particularly limited, and for example, electrodes in which an oxidoreductase and an electron transfer mediator are immobilized on an electrode surface formed of a conductive porous material can be used. As the conductive porous material forming the cathodes 12a and 12b, a well-known material can be used, and a carbon-based material such as porous carbon, carbon pellet, carbon felt, carbon paper, carbon fiber, or a stack of carbon fine particles is particularly preferable.

Examples of the oxidoreductase immobilized on the cathodes 12a and 12b include bilirubin oxidase, laccase, and ascorbic acid oxidase. In addition, examples of the electron transfer mediator which is immobilized together with the enzyme include potassium hexacyanoferrate (II), potassium hexacyanoferrate (III), potassium ferricyanide, and potassium octacyanotungstate.

In addition, the cathodes 12a and 12b are also not limited to an electrode in which an oxidoreductase is immobilized on a surface thereof. As long as an oxidoreductase is present on an electrode surface, for example, an electrode to which a microorganism having an oxidoreductase and functioning as a reaction catalyst is adhered can be used.

(Separator 13a and 13b)

The separator 13a and 13b prevent the short-circuiting of the respective electrodes (the anodes 11a and 11b and the cathodes 12a and 12b) and are formed of a material (proton conductor) having flexibility through which protons are permeable. Specifically, non-woven fabric, cellophane, a perfluorosulfonic acid-based ion exchange membrane, or the like can be used.

(Current Collectors 14a, 14b, 15a, and 15b)

The material of the current collectors 14a, 14b, 15a, and 15b are not particularly limited and may be a material which can be electrically connected to an external device and does not allow an electrochemical reaction to occur in the biofuel cell. Specifically, examples of the material include a metal material such as Pt, Ag, Au, Ru, Rh, Os, Nb, Mo, In, Ir, Zn, Mn, Fe, Co, Ti, V, Cr, Pd, Re, Ta, W, Zr, Ge, or Hf; an alloy such as alumel, brass, duralumin, bronze, nickelin, platinum rhodium, permalloy, permendur, nickel silver, or phosphor bronze; a conductive polymer such as polyacetylenes; a carbon-based material such as carbon felt, carbon paper, carbon fiber, or a stack of carbon fine particles; a boride such as $HfB_2$, NbB, $CrB_2$, or $B_4C$; a nitride such as TiN or ZrN; a silicide such as $VSi_2$, $NbSi_2$, $MoSi_2$, or $TaSi_2$; and a composite material of the above-described compounds.

(Protective Sheets 16a and 16b)

The protective sheets 16a and 16b press the anodes 11a and 11b against the cathodes 12a and 12b, presses the above-described current collectors 14a, 14b, 15a, and 15b against the anodes 11a and 11b and the cathodes 12a and 12b, and are provided as necessary. In addition, the respective protective sheets 16a and 16b are provided with an opening, a hole, or the like such that a fuel solution 5 is supplied to the anodes 11a and 11b.

The material, the thickness, the properties, and the like of the protective sheets 16a and 16b are not particularly limited, and a well-known material such as a laminated film or a double-sided adhesive tape can be appropriately selected to be used. In addition, as in the case of MEA (Membrane Electrode Assembly), when the respective members forming the respective power generating bodies 1a and 1b are integrated with each other or when the respective members are integrated with the gas diffusion layer 2, power can be generated by immersing the integrated body in the fuel solution 5 in the above state. Therefore, the protective sheets 16a and 16b are unnecessary.

[Gas Diffusion Layer 2]

The gas diffusion layer 2 supplies oxygen ($O_2$) necessary for the reaction to the cathodes 12a and 12b, and only gas is permeable through the gas diffusion layer 2 without allowing liquid to permeate therethrough. The material of the gas diffusion layer 2 is not particularly limited, and for example, carbon paper, carbon cloth, or a non-woven or porous metal material can be used. In addition, examples of the porous metal material forming the gas diffusion layer 2 include Ni, Ti, Pt, Ag, Au, Ru, Rh, Os, Nb, Mo, In, Ir, Zn, Mn, Fe, Co, V, Cr, Pd, Re, Ta, W, Zr, Ge, and Hr, but the porous metal material is not limited thereto. Further, as necessary, the gas diffusion layer 2 can be subjected to a water-repellant treatment.

[Fuel Tank 4]

The fuel tank 4 contains the fuel solution 5 and can be formed of, for example, various plastic materials such as polyethylene, polystyrene, polypropylene, AS resin (Acrylonitrile Styrene Copolymer), ABS resin (Acrylonitrile Butadiene Styrene Copolymer), vinyl chloride resin, methacrylic resin, polyethylene terephthalate, or polycarbonate; an elastic body such as natural rubber or synthetic rubber; or an insulating metal oxide such as alumina, silica, or ceramics. The structure is not particularly limited as long as an opening through which the fuel solution 5 can be injected is provided.

[Fuel Solution 5]

"The fuel solution 5" supplied to the biofuel cell according to the embodiment is a fuel component such as saccharide, alcohol, aldehyde, lipid, or protein or is a solution containing at least one of the fuel components. In addition, examples of the fuel components include saccharides such as glucose, fructose, or sorbose; alcohols such as methanol, ethanol, propanol, glycerin, polyvinyl alcohol; aldehydes such as formaldehyde or acetaldehyde; and organic acids such as acetic acid, formic acid, or pyruvic acid. In addition, for example, lipid, protein, or an organic acid which is an intermediate product of glucose metabolism thereof can be used as the fuel component.

In this way, in the biofuel cell according to the embodiment, since oxygen ($O_2$) is supplied to the cathodes 12a and 12b through the gas diffusion layer 2 provided inside the stack 3, it is not necessary that the cathodes 12a and 12 be in direct contact with gas phase (the outside air). Therefore, it is not necessary that an air layer be provided inside the cell, and the cell volume can be reduced. In addition, the stack 3 only has to be immersed in the fuel solution and is not required to be integrated with the fuel tank. Therefore, the manufacturing process can be simplified.

Further, when the power generating bodies 1a and 1b are connected in series, it is necessary that the fuel solution 5 be separated for each power generating body to prevent short-circuiting. However, in the biofuel cell according to the embodiment, the fuel solution 5 in the fuel tank 4 can be mutually separated by the stack 3. As a result, since the number of parts forming the cell can be reduced, the cell volume can be reduced without decreasing the output. Further, reduction in manufacturing cost can be expected.

The fuel cell 1 according to the embodiment can be used in all the devices requiring electric power, for example, moving bodies such as automobiles, two-wheel vehicles, airplanes, rockets, and spaceships, electronic apparatuses, power plants, construction machines, machine tools, power generation systems, and cogeneration systems. The size, the shape, the fuel type, and the like of the fuel cell 1 according to the embodiment can be appropriately selected and set according to the use.

In the case of the electronic apparatuses, the fuel cell 1 can be applied to any of portable type and stationary type electronic apparatuses without being limited to the type thereof. Specific examples of the electronic apparatuses include mobile phones, mobile devices, robots, computers, PDAs (Personal Digital Assistant), music players, toys, game machines, on-vehicle devices, home electric appliances, and industrial products. The fuel cell 1 according to the embodiment is preferably used as a power source of the above-described various electronic apparatuses.

2. First Modification Example of First Embodiment

Overall Configuration

Figure 3:
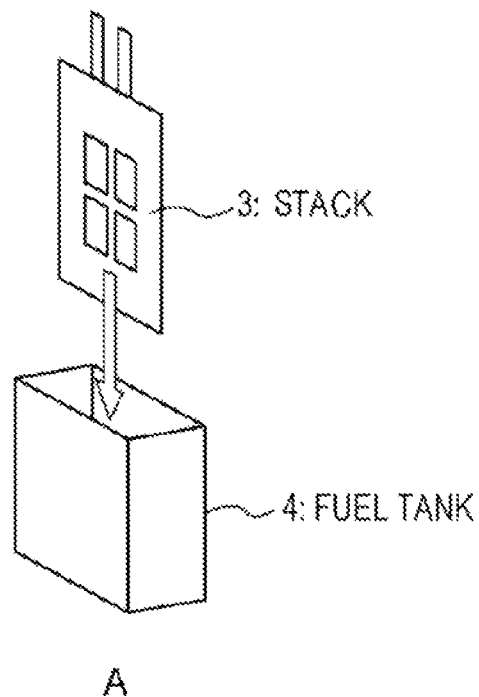
FIG. 3A is a perspective view illustrating a fuel supply method of a biofuel cell according to a first modification example of the first embodiment of the present disclosure.
FIG. 3B is a cross-sectional view thereof.
Figure 3:
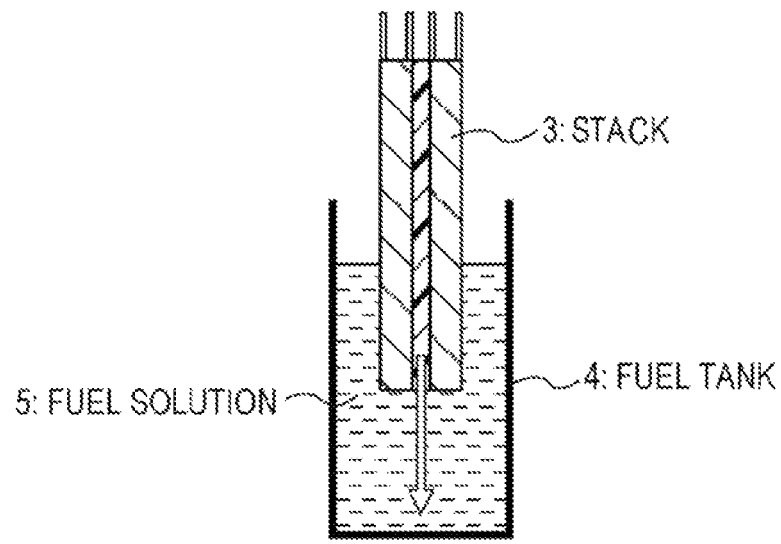

Next, a biofuel cell according to a first modification example of the first embodiment of the present disclosure will be described. In the biofuel cell according to the modification example, the stack 3 is detachable from the fuel tank 4. FIG. 3A is a perspective view illustrating a fuel supply method of the biofuel cell according to the first modification example of the first embodiment of the present disclosure, and FIG. 3B is a cross-sectional view thereof.

As illustrated in FIGS. 3A and 3B, when the fuel solution 5 or the fuel component is injected to the biofuel cell according to the modification example, the stack 3 is taken out from the fuel tank 4 or the stack 3 is pulled up to form a space between the stack 3 and the fuel tank 4. As a result, through one manipulation, the filling of the fuel solution 5 of the two power generating bodies 1a and 1b or the replenishment of the fuel component can be performed. After completion of the injection of the fuel solution 5 or the fuel component, the stack 3 can be mounted on the fuel tank 4. As a result, for example, when the power generating bodies 1a and 1b are connected in series, the fuel solution 5 is mutually separated by the stack 3, and thus short-circuiting between electrodes is prevented.

In addition, when the power generating bodies 1a and 1b are connected in series, it is preferable that a surface of the stack 3 in contact with the fuel tank 4 be subjected to a water-repellant treatment. As a result, the short-circuiting prevention effect can be further improved. In addition, in the bottom of the fuel tank 4, a gasket (not illustrated) or the like to which an end of the stack 3 is fitted may be provided. With this method, the short-circuiting prevention effect can be improved.

In the biofuel cell according to the modification example, since the stack 3 is detachable from the fuel tank 4, the filling of the fuel solution 5 and the replenishment of the fuel component can be easily performed. In addition, the device configuration can be simplified. In addition, configurations and effects of the biofuel cell according to the modification example other than those described above are the same as those of the above-described first embodiment.

3. Second Modification Example of First Embodiment

Overall Configuration

Figure 4:
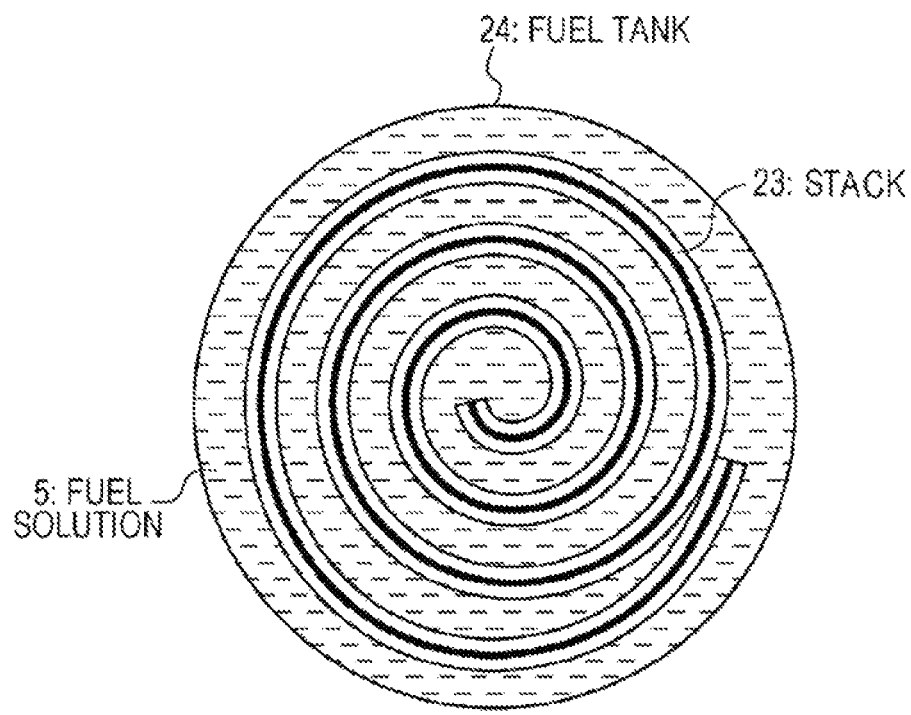
FIG. 4 is a cross-sectional view schematically illustrating a configuration of a biofuel cell according to a second modification example of the first embodiment of the present disclosure.
Figure 5:
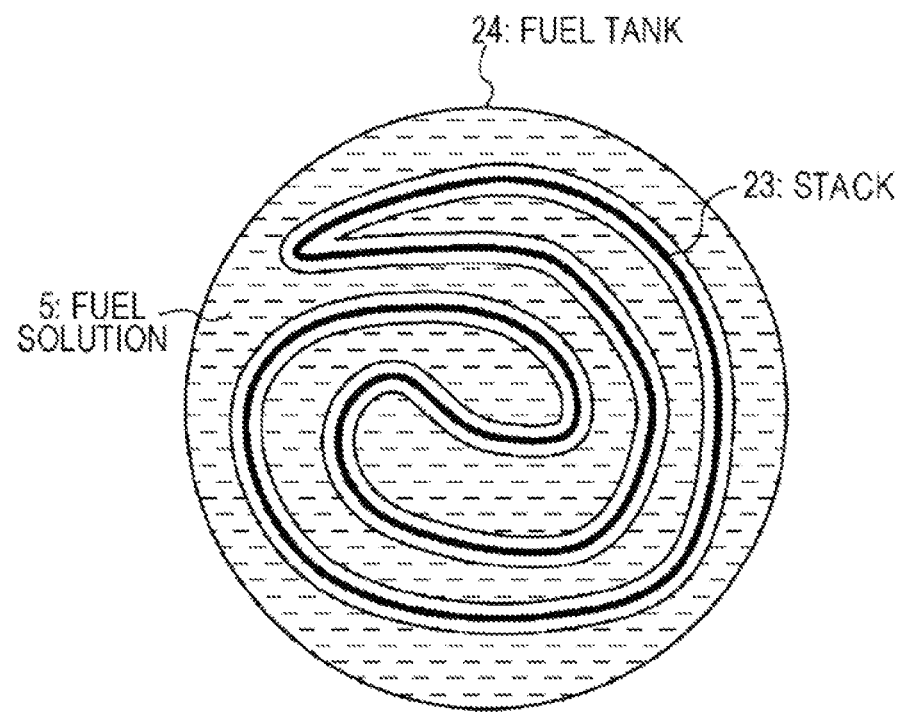
FIG. 5 is a cross-sectional view schematically illustrating another configuration of the biofuel cell according to the second modification example of the first embodiment of the present disclosure.
Figure 6:
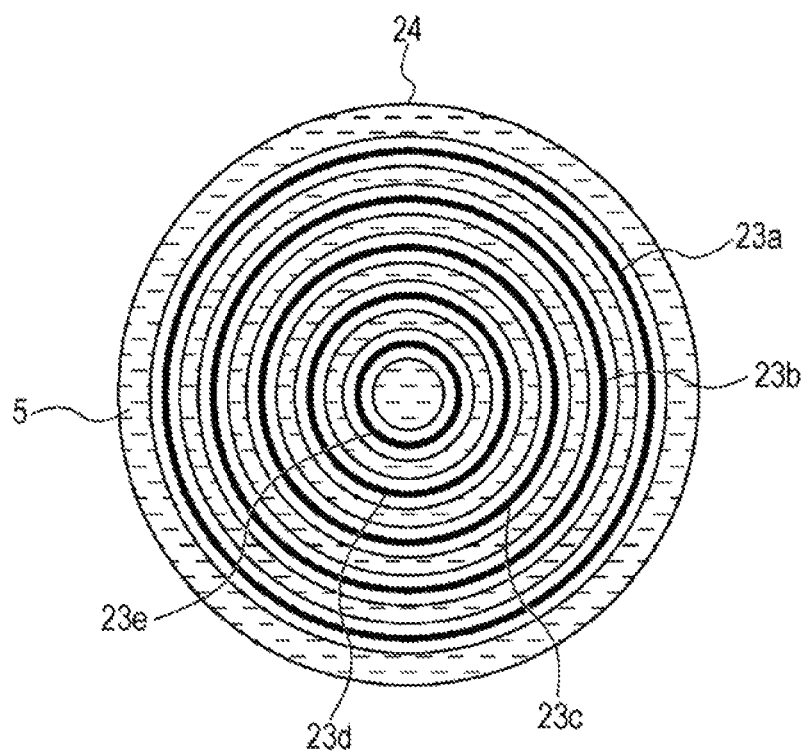
FIG. 6 is a cross-sectional view schematically illustrating still another configuration of the biofuel cell according to the second modification example of the first embodiment of the present disclosure.

Next, a biofuel cell according to a second modification example of the first embodiment of the present disclosure will be described. FIGS. 4 to 6 are cross-sectional views schematically illustrating a configuration of the biofuel cell according to the second modification example of the first embodiment of the present disclosure. In the biofuel cells according to the above-described first embodiment and first modification example thereof, the sheet-shaped or plate-shaped stack is mounted on the fuel tank as it is, but the present disclosure is not limited thereto. For example, as illustrated in FIG. 4, the stack 23 can be mounted on the fuel tank 24 in a state of being wound.

In addition, as illustrated in FIG. 5, the stack 23 can be mounted on the fuel tank 24 in a state of being rounded. As a result, two series of biofuel cells can be manufactured. Further, as illustrated in FIG. 6, when plural stacks 23a to 23e are concentrically arranged inside the fuel tank 24, multiple series of biofuel cells can be manufactured.

With the above-described configuration illustrated in FIGS. 4 to 6, a cylindrical or button type bio cell can be realized. In addition, in the biofuel cell according to the modification example, the stacks 23 and 23a to 23e are detachable from the fuel tank 24. As a result, the filling of the fuel solution 5 or the replenishment of the fuel component can be easily performed. In addition, configurations and effects of the biofuel cell according to the modification example other than those described above are the same as those of the above-described first embodiment or the first modification example thereof.

4. Second Embodiment

Overall Configuration

Figure 7:
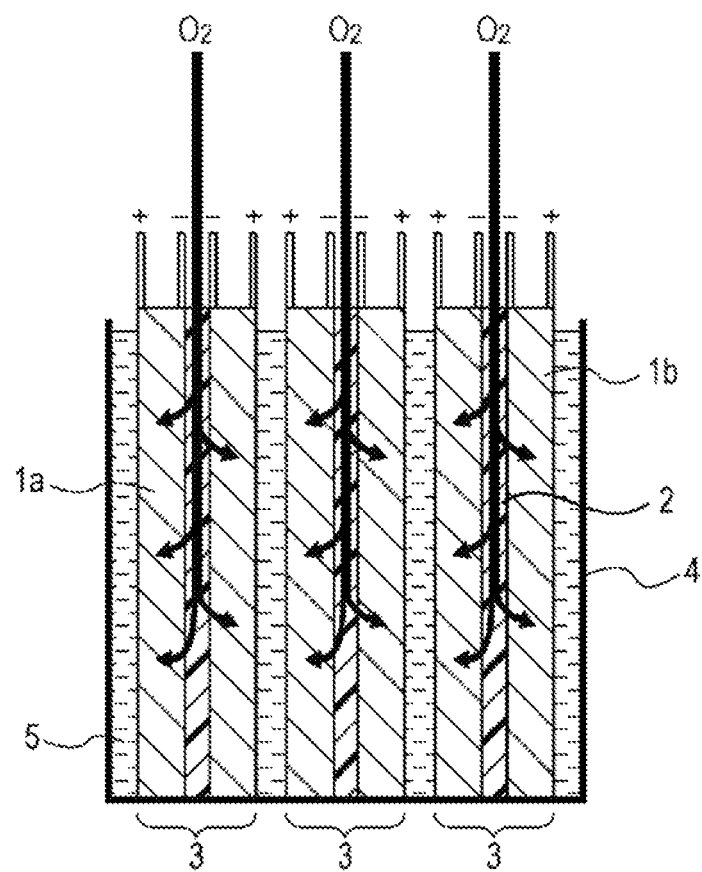
FIG. 7 is a cross-sectional view schematically illustrating a cell configuration of a biofuel cell according to a second embodiment of the present disclosure.

Next, a biofuel cell according to a second embodiment of the present disclosure will be described. FIG. 7 is a cross-sectional view schematically illustrating a cell configuration of the biofuel cell according to the embodiment. As illustrated in FIG. 7, in the biofuel cell according to the embodiment, plural stacks 3 including the two power generating bodies 1a and 1b and the gas diffusion layer 2 are arranged inside the fuel tank 4.

In the biofuel cell according to the embodiment, oxygen ($O_2$) necessary for the reaction is supplied from the gas diffusion layer 2 to the cathodes 12a and 12b of the power generating bodies 1a and 1b. Therefore, three or more power generating bodies can be arranged inside the single fuel tank 4. As a result, compared to a biofuel cell of the related art, the cell volume can be reduced, and the capacity can be increased.

In addition, as illustrated in FIG. 7, in the biofuel cell according to the embodiment, since the fuel solution 5 in the fuel tank 4 can be mutually separated by the stacks 3, the respective power generating bodies 1a and 1b can be connected in series. On the other hand, when the respective power generating bodies 1a and 1b are connected in parallel or when power is output from each of the power generating bodies 1a and 1b, it is not necessary that the fuel solution 5 be separated. Therefore, a space may be provided between the stacks 3 and a wall surface or the bottom of the fuel tank 4. As a result, the filling of the fuel solution 5 and the replenishment of the fuel component can be easily performed.

On the other hand, although not illustrated in FIG. 7, in the fuel tank 4, together with the stacks 3, the gas diffusion layer 2 may be arranged to be in contact with a surface of the power generating body 1a or the power generating body 1b on the cathode 12a or 12b side, that is, one power generating body may be provided. In addition, configurations and effects of the biofuel cell according to the embodiment other than those described above are the same as those of the above-described first embodiment.

5. Modification Example of Second Embodiment

Overall Configuration

Figure 8:
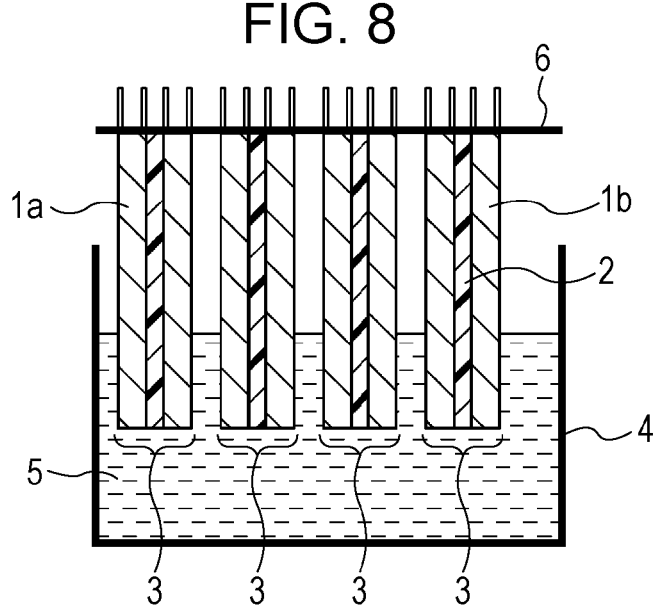
FIGS. 8A and 8B are cross-sectional views schematically illustrating a cell configuration of a biofuel cell according to a modification example of the second embodiment of the present disclosure.
Figure 8:
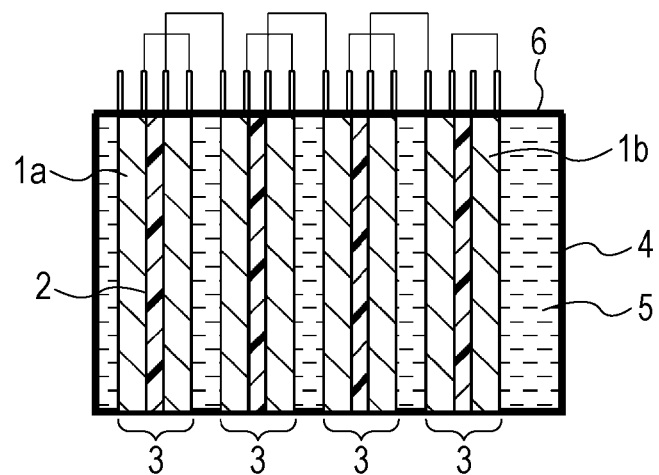

Next, a biofuel cell according to a modification example of the second embodiment of the present disclosure will be described. FIGS. 8A and 8B are cross-sectional views schematically illustrating a cell configuration of the biofuel cell according to the modification example. As illustrated in FIGS. 8A and 8B, in the biofuel cell according to the modification example, the plural stacks 3 are connected through a cover 6 of the fuel tank 4.

As illustrated in FIG. 8A, in the biofuel cell, all the stacks 3 can be pulled up together with the cover 6. Even when the plural stacks 3 are provided, the filling of the fuel solution 5 and the replenishment of the fuel component in all the power generating bodies can be performed through one manipulation. In addition, since the stacks 3 are fixed to the cover 6, it is not necessary that the stacks 3 be positioned independently when being mounted in the fuel tank 4. Therefore, even when the plural stacks 3 are provided, the workload can be reduced, and the replenishment and the replacement of the fuel solution 5 can be easily performed.

The number of stacks 3 connected through the cover 6 is not particularly limited and can be appropriately set according to the size and the use of the cell. In addition, the number of covers 6 is not necessarily one, and plural covers may also be dividedly provided. Further, in the biofuel cell according to the modification example, a surface of the stack 3 in contact with the fuel tank 4 may be subjected to a water-repellant treatment, or a gasket (not illustrated) or the like to which an end of the stack 3 is fitted may be provided in the bottom of the fuel tank 4. As a result, when the power generating bodies 1a and 1b are connected in series, the short-circuiting prevention effect can be further improved.

In addition, configurations and effects of the biofuel cell according to the modification example other than those described above are the same as those of the above-described second embodiment.

Examples

Figure 9:
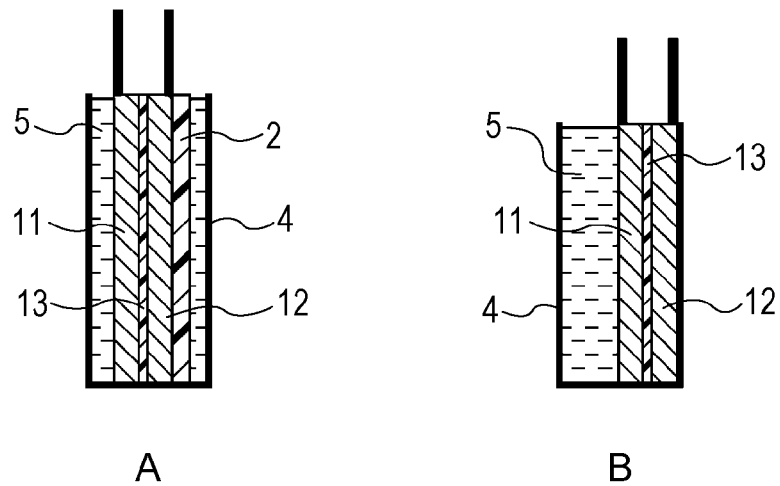
FIG. 9A is a schematic diagram illustrating a cell structure of a biofuel cell according to an example of the present disclosure.
FIG. 9B is a schematic diagram illustrating a cell structure of a biofuel cell according to a comparative example.

Hereinafter, the effects of the present disclosure will be described in detail using an example of the present disclosure. FIG. 9A is a schematic diagram illustrating a cell structure of a biofuel cell according to an example of the present disclosure, and FIG. 9B is a schematic diagram illustrating a cell structure of a biofuel cell according to a comparative example. In the example, regarding the biofuel cell having an immersion cell structure illustrated in FIG. 9A and the biofuel cell having a tank cell structure of the related art illustrated in FIG. 9B, electrochemical characteristics were measured and compared to each other.

At this time, as the anode 11, a carbon fiber electrode (2 cm×2 cm) in which an enzyme (GDH), a coenzyme (NADH), and a mediator (for example, ANQ) are immobilized was used. In addition, as the cathode 12, a carbon fiber electrode (2 cm×2 cm) in which the immobilization of an enzyme (BOD) and a mediator (Fe(CN)) were immobilized was used. Further, a 2 cm×2 cm titanium mesh was used as the current collector (not illustrated), and non-woven fabric formed of PTFE was cut into a size of 2.5 cm×2.5 cm and used as the separator 13.

On the other hand, carbon paper manufactured by Toray Industries Ltd. was used as the gas diffusion layer 2, and a laminated film manufactured by FUJIPLA Inc. was used as the protective sheet (not illustrated). In addition, as the fuel solution 5, a 0.4M glucose-2M imidazole solution (pH 7.0) was used.

Figure 10:
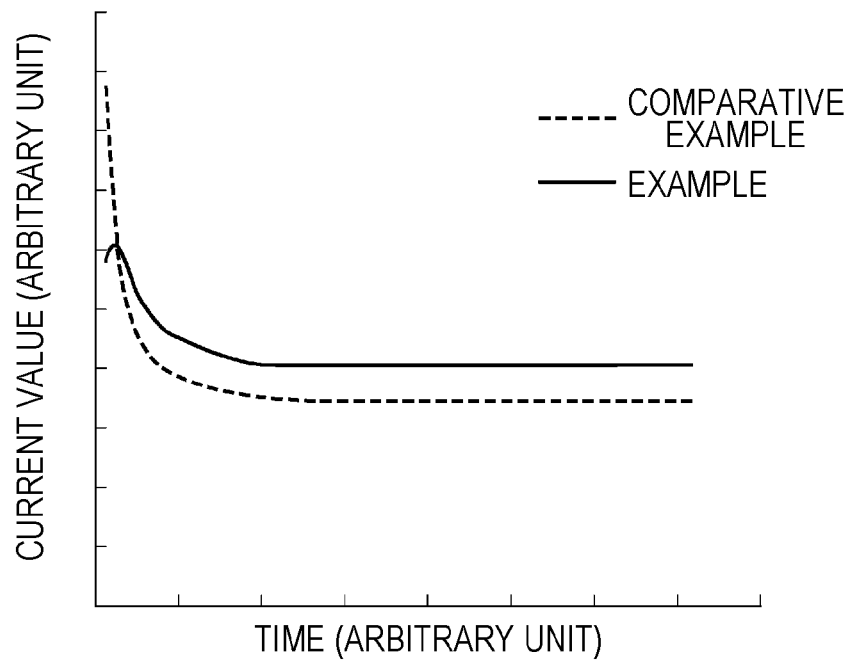
FIG. 10 is a graph illustrating electrochemical characteristics of the cells according to the example and the comparative example, in which the horizontal axis represents the time and the vertical axis represents a current value.
Figure 11:
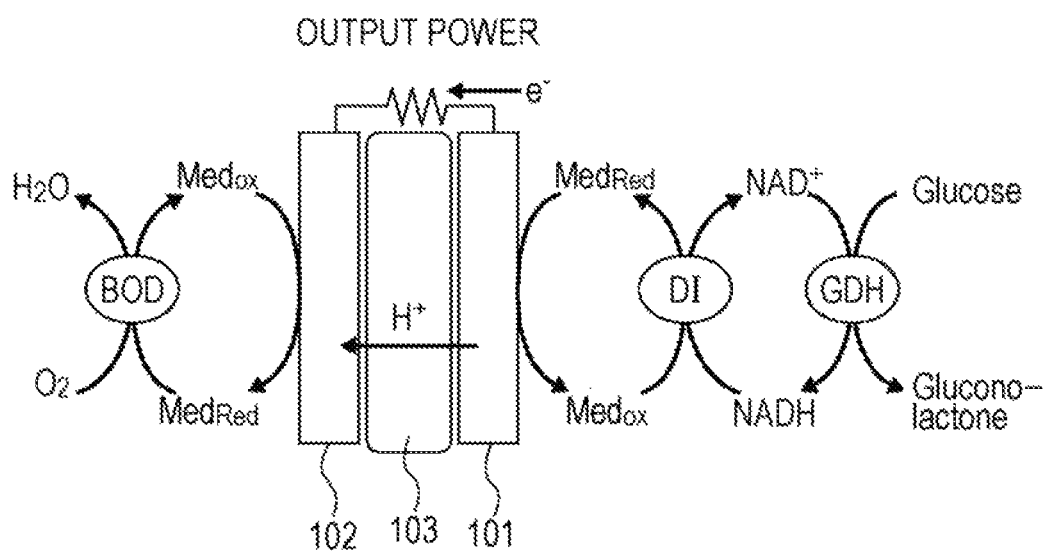
FIG. 11 is a diagram schematically illustrating the power generation principle of a biofuel cell using an enzyme.

The biofuel cells according to the example and the comparative example were operated at an operating power of 0.5 V. FIG. 10 is a graph illustrating electrochemical characteristics of the cells according to the example and the comparative example, in which the horizontal axis represents the time and the vertical axis represents a current value. As illustrated in FIG. 10, the biofuel cell having an immersion cell structure and the biofuel cell having a tank cell structure of the related art showed equivalent electrochemical characteristics.

In addition, the present disclosure can adopt the following configurations.

(1) A biofuel cell including:
plural power generating bodies that include at least a pair of electrodes and a separator, the electrodes forming an anode and a cathode and having at least one surface on which an oxidoreductase is present, the separator being arranged between the electrodes and including a proton permeable membrane; and
a gas diffusion layer that is arranged in contact with cathode-side surfaces of the power generating bodies and through which only gas is permeable,
in which one power generating body and another power generating body are stacked through the gas diffusion layer.

(2) The biofuel cell according to (1),
in which the respective power generating bodies are connected in series, and
a fuel solution in a fuel tank is mutually separated by a stack of the power generating bodies and the gas diffusion layer.

(3) The biofuel cell according to (1) or (2),
in which a stack of the power generating bodies and the gas diffusion layer is detachable from the fuel tank.

(4) The biofuel cell according to any one of (1) to (3),
in which plural stacks of the power generating bodies and the gas diffusion layer are connected through a cover of a fuel tank.

(5) The biofuel cell according to any one of (1) to (4),
in which the gas diffusion layer is formed of carbon paper, carbon cloth, or a non-woven or porous metal material.

(6) An electronic apparatus including the biofuel cell according to any one of (1) to (5).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST 1a, 1b, 100 POWER GENERATING BODY
2 GAS DIFFUSION LAYER
3, 23 STACK
4, 24, 110 FUEL TANK
5, 111 FUEL SOLUTION
6 COVER
11, 11a, 11b, 101 ANODE
12, 12a, 12b, 102 CATHODE
13, 13a, 13b SEPARATOR
14a, 14b, 15a, 15b CURRENT COLLECTOR
16a, 16b PROTECTIVE SHEET
103 PROTON CONDUCTOR

The invention claimed is:

1. A biofuel cell, comprising:
a plurality of power generating bodies that include at least a pair of electrodes and a separator, the pair of electrodes forming an anode and a cathode and having at least one surface on which an oxidoreductase is present, the separator being arranged between the pair of electrodes and including a proton permeable membrane; and
a gas diffusion layer that is arranged in contact with cathode-side surfaces of the plurality of power generating bodies and through which only gas is permeable, wherein:
a plurality of cylindrical stacks of the plurality of power generating bodies and the gas diffusion layer are concentrically arranged in a fuel tank to separate a fuel solution; and
the gas diffusion layer is between and abuts each of a first power generating body of the plurality of power generating bodies, and a second power generating body of the plurality of power generating bodies.

2. The biofuel cell according to claim 1,
wherein the respective plurality of power generating bodies are connected in series, and
a fuel solution in a fuel tank is mutually separated by a stack of the plurality of power generating bodies and the gas diffusion layer.

3. The biofuel cell according to claim 2,
wherein a stack of the plurality of power generating bodies and the gas diffusion layer is detachable from the fuel tank.

4. The biofuel cell according to claim 1,
wherein a plurality of stacks of the plurality of power generating bodies and the gas diffusion layer are connected through a cover of a fuel tank.

5. The biofuel cell according to claim 1,
wherein the gas diffusion layer is formed of carbon paper, carbon cloth, or a non-woven or porous metal material.

6. An electronic apparatus, comprising
a biofuel cell,
wherein the biofuel cell includes:
a plurality of power generating bodies that include at least a pair of electrodes and a separator, the pair of electrodes forming an anode and a cathode and having at least one surface on which an oxidoreductase is present, the separator being arranged between the pair of electrodes and including a proton permeable membrane;
a gas diffusion layer that is arranged in contact with cathode-side surfaces of the plurality of power generating bodies and through which only gas is permeable, in which the gas diffusion layer is between and abuts each of a first power generating body of the plurality of power generating bodies, and a second power generating body of the plurality of power generating bodies; and
a plurality of cylindrical stacks of the plurality of power generating bodies and the gas diffusion layer are concentrically arranged in a fuel tank to separate a fuel solution.

* * * * *